(12) United States Patent
Newkome et al.

(10) Patent No.: US 8,148,438 B2
(45) Date of Patent: Apr. 3, 2012

(54) REVERSIBLE SELF-ASSEMBLY OF IMBEBBED METALLOMACROCYCLES WITHIN A MACROMOLECULAR SUPERSTRUCTURE

(75) Inventors: George R. Newkome, Medina, OH (US); Charles N. Moorefield, Akron, OH (US); Pingshan Wang, Cuyahoga Falls, OH (US)

(73) Assignee: The University of Akron, Akron, OH (US)

( * ) Notice: Subject to any disclaimer, the term of this patent is extended or adjusted under 35 U.S.C. 154(b) by 557 days.

(21) Appl. No.: 11/720,088

(22) PCT Filed: Nov. 23, 2005

(86) PCT No.: PCT/IB2005/053885
§ 371 (c)(1),
(2), (4) Date: Feb. 9, 2009

(87) PCT Pub. No.: WO2006/056953
PCT Pub. Date: Jun. 1, 2006

(65) Prior Publication Data
US 2009/0171088 A1  Jul. 2, 2009

Related U.S. Application Data

(60) Provisional application No. 60/631,084, filed on Nov. 24, 2004.

(51) Int. Cl.
*C08J 99/00* (2006.01)
*C07F 9/02* (2006.01)
(52) U.S. Cl. .............................. 521/53; 546/4
(58) Field of Classification Search ............. 521/53; 546/4
See application file for complete search history.

(56) References Cited

U.S. PATENT DOCUMENTS
4,555,478 A  11/1985  Reczek et al.

OTHER PUBLICATIONS

Caplus English Abstract DN 140:406615, Wang et al., Synthesis, X-ray structure, and self-assembly of functionalized Bis (2,2':6',2"-terpyridinyl)arenes, Mach 2004, vol. 6, Issue 8, pp. 1197-1200.
Caplus English Abstract DN 142:474794, Mar. 2005, vol. 44, Issue 11 pp. 1679-1683.
"Molecular Imprinting: from fundamentals to applications" authored by M. Komiyama, T. Takeuchi, T. Mukawa, H. Asanuma, by Wiley-VCH, New York 2002.
C. Alexander, L. Davidson, W. Hayes, Tetrahedron 2003, 59, 2025-2057.
K. Haupt, K. Mosbach, Chem. Rev. 2000, 100, 2495-2504.
K. Mosbach, Y. Yu, J. Andersch, L. Ye, J. Am. Chem. Soc. 2001, 123, 12420-12421.
M. Subat, A.S. Borovik, B. Konig, J. Am. Chem. Soc. 2004, 126, 3185-3190.
J. B. Beil, S. C. Zimmerman, Chem. Commun. 2004,488-489; N. G. Lemcoff, T. A. Spurlin, A. A. Gewirth, S. C. Zimmerman, J. B. Bell, S. L. Elmer, H. G. Vandeveer, J Am. Chem. Soc. 2004, 126, 11420-11421; S. L. Elmer, S. C. Zimmerman J Org. Chem. 2004,69,7363-7366.

(Continued)

*Primary Examiner* — Rita Desai
(74) *Attorney, Agent, or Firm* — Renner, Kenner, Greive, Bobak, Taylor & Weber

(57) ABSTRACT

In accordance with the present invention, there is provided a method for preparing a reversible, self-assembly of an imbedded hexameric metallomacrocycle within a macromolecular superstructure. The method occurs by an intramolecular mechanism in which a macromolecular skeleton possesses multiple ligands capable of reversible assembly-disassembly triggered by the presence of metal ions.

14 Claims, 5 Drawing Sheets

OTHER PUBLICATIONS

S. C. Zimmerman, I. Zharov, M. S. Wendland, N. A. Rakow, K. S. Suslick, J. Am. Chem. Soc. 2003, 125, 13504-13518.
Y. Kim, M. F. Mayer, S. C. Zimmerman, Angew. Chem. Int. Ed. 2003, 42, 1121-1126.
M. C. Jimenez, C. Dietrich-Buchecker, J.-P. Sauvage, Angew. Chem. Int. Ed. 2000, 39, 3284-3287.
G. R. Newkome, T. J. Cho, C. N. Moorefield, G. R. Baker, M. J. Saunders, R. Cush, P. S. Russo, Angew. Chem. Int. Ed. 1999, 38, 3717-3721.
G. R. Newkome, T. J. Cho, C. N. Moorefield, R. Cush, P. S. Russo, L. A. Godinez, M. J. Saunders, Chem. Eur. J 2002, 8, 2946-2954.
G. R. Newkome, T. J. Cho, C. N. Moorefield, P. P. Mohapatra, L. A. Godinez, Chem. Eur. J 2004, 10, 1493-1500.
B. G. G. Lohmeijer, U. S. Schubert, Macromol. Chem. Phys. 2003, 204, 1072-1078.
B. X. Colasson, J.-P. Sauvage, Inorg. Chem. 2004, 43, 1895-1901.
P. Wang, C. N. Moorefield, G. R. Newkome, Org. Lett. 2004, 6, 1197-1200.
A. V. Chuchurjukin, H. P. Dijkstra, B. M. J. M. Suijkerbuijk, R. J. M. K. V Gebbink, G. P. M. van Klink, A. M. Mills, A. L. Spek, G. van Koten, Angew. Chem. Int. Ed. 2003, 42, 228-230.
A. F. M. Kilbinger, S. J. Cantrill, A. W. Waltman, M. W. Day, R. B. Grubbs, Angew. Chem. Int. Ed. 2003, 42, 3281-3285.
V. Martinez, J.-C. Blais, D. Astruc, Angew. Chem. Int. Ed. 2003, 42, 4366-4369.
X. A. Dominguez, I. C. Lopez, R. Franco, J. Org. Chem. 1961, 26, 1625.
M. Ruben, J. Rojo, F. J. Romero- S alguero, L. H. Uppadine, J.-M. Lehn, Angew. Chem. Int. Ed. 2004, 43, 3644-3662.
P. Wang, C. N. Moorefield, G. R. Newkome, Angew. Chem. Int. Ed. 2004, 1-9.

REVERSIBLE SELF-ASSEMBLY OF IMBEBBED METALLOMACROCYCLES WITHIN A MACROMOLECULAR SUPERSTRUCTURE

This application claims the benefit of U.S. Provisional Patent Application Ser. No. 60/631,084, filed Nov. 24, 2004, herein incorporated by reference.

FIELD OF THE INVENTION

The present invention relates to the preparation of shape-specific molecular building blocks that can be self-assembled into a primary, metallocyclic structure to facilitate preparation of secondary band-like supporting macrocyclic framework. The secondary structure allows for the reversible disassembly and reassembly of the primary metallmacrocycle. More specifically, the present invention relates to the preparation of molecular architectures wherein the building blocks are constructed to facilitate their connectivity in a precise and controlled manner resulting in a desired molecular shape in a reversible manner.

BACKGROUND OF THE INVENTION

Molecular imprinting processes widely occur in complex biosystems, thus, selective and specific biological moieties bound by antibodies, such as hormones, are vital for basic cell-cell communication. Experimental simulation of cell imprinting has been predominately developed using bulk polymerizations in which guests, or templates, are used to create a molecular "impression" via incorporation within the infrastructure of appropriately juxtaposed ionic, hydrogen bonding, or other non-covalent loci. Small organic guests are typically used as the template from which, after its removal, the cavity, shape, and binding site's directivity of the host are frozen in orientation for subsequent re-recognition of structurally related guests. There has been developed a novel monomolecular imprinting process, whereby porphyrin-cored dendrimers possessing terminal alkenes were initially created, followed by alkene cross linking to give the host-guest combination; porphyrin removal thus created the desired cavity possessing the desired recognition sites. Such host-guest molecular recognition generally relies on intermolecular assembly of components.

Based on previous work concerning the hexameric self-assembly of meta-bis(terpyridinyl)arenes possessing the critical 120° angle with respect to the two ligating moieties, it was noted that the Fe(II) hexamer is sensitive to basic conditions compared to the more robust Ru(II) analogue; thus under basic conditions, demetallation quantitatively regenerated the starting bis-ligand. It has similarly been shown that the related tpy$_2$Cu complex can also be destroyed by KCN. Such a facile disassembly process coupled with the high yield hexamer macrocyclization suggests the possibly of reversible assembly in an appropriate molecular nanotemplate.

Thus there exits a need to provide a method of molecular nanofabrication wherein the self-assembly process occurs by an intramolecular mechanism in which a macromolecular skeleton possesses multiple ligands capable of reversible assembly-disassembly triggered by the presence of metal ions.

SUMMARY OF THE INVENTION

It is, therefore, an aspect of the present invention to provide a method of preparing a reversible, self-assembly of an imbedded hexameric metallomacrocycle within a macromolecular superstructure.

It is another aspect of the present invention to provide a method of preparing a metallomacrocycle. The method includes preparing an alkene-modified ligand, reacting the ligand with at least a first source of a metal ion to form a first hexamer and crosslinking the hexamer with a first catalyst to form an inner macrocyclic complex. The method further includes disassembling the inner macrocyclic complex to form a demetallated macrocycle and regenerating the inner macrocyclic complex through the addition of at least a second source of a metal ion to the demetallated macrocycle. The method also includes reducing the demetallated macrocycle with at least a second catalyst to form an ethereal macrocyclic complex and reacting the ethereal macrocyclic complex with at least a third source of a metal ion to form the inner macrocyclic complex.

This and other advantages of the present invention are achieved by the method as described in more detail below.

DETAILED DESCRIPTION OF THE INVENTION

Generally, the present invention provides a method of molecular nanofabrication wherein the self-assembly process occur by an intramolecular mechanism in which a macromolecular skeleton possesses multiple ligands capable of reversible assembly-disassembly triggered by the presence of metal ions.

Figure 1:
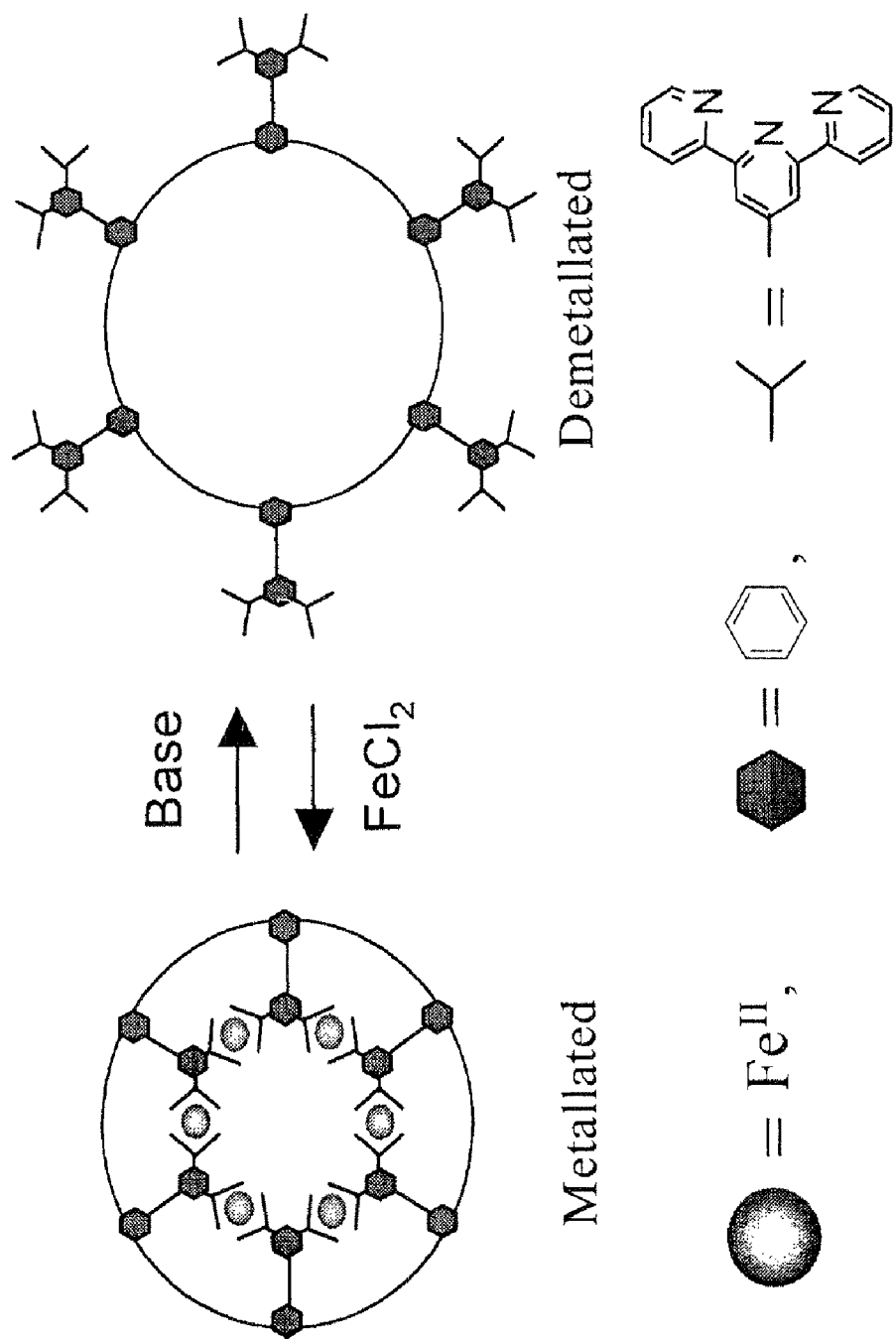
FIG. 1 is a schematic representation of reversible metallation-dematallation that facilitates the formation of a templated hexamer.
Figure 2:
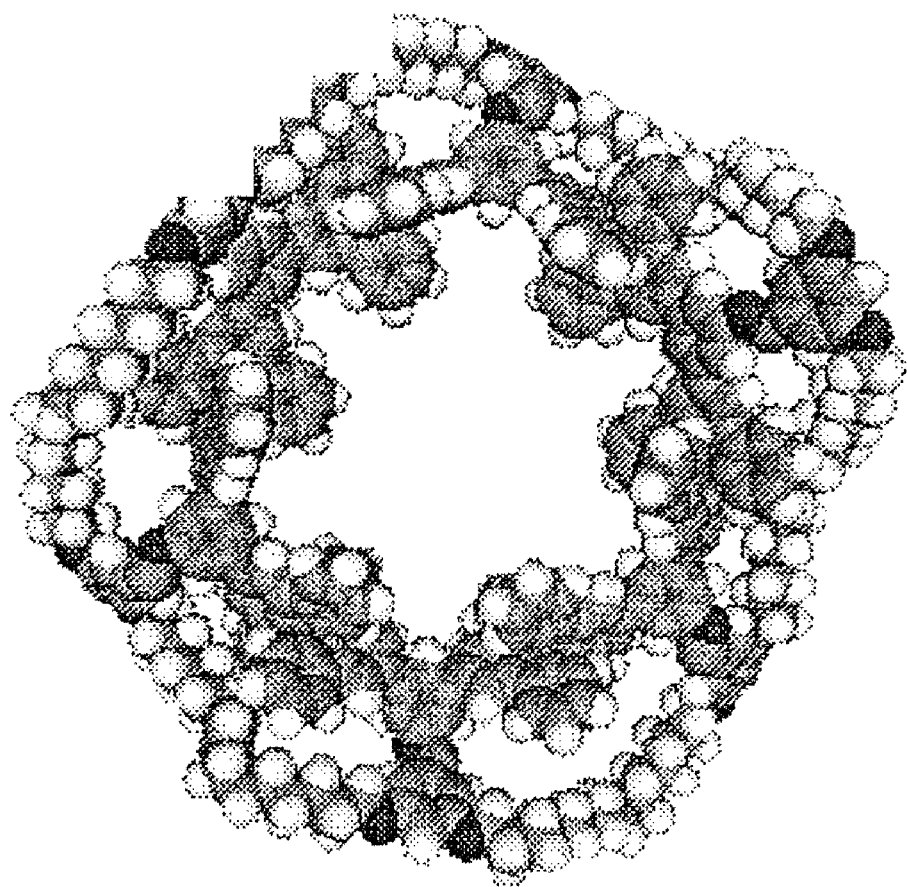
FIG. 2 is a computer generated model of the templated hexamer 3.

As seen in FIG. 1, a reversible, assembly-disassembly method is used in preparing a hexametallomacrocycle containing twelve terpyridine groups enclosed within a 114-membered macrocyclic structure. The design of the initial bisterpyridine ligand was facilitated by molecular modeling simulations, as seen in FIG. 2, in order to optimize the requisite alkyl chain length and thus the final ring circumference. Subsequently, oct-7-enyl groups were attached to a bisterpyridinylphenol to yield (82%) the alkene-modified ligand 1.

Figure 3:
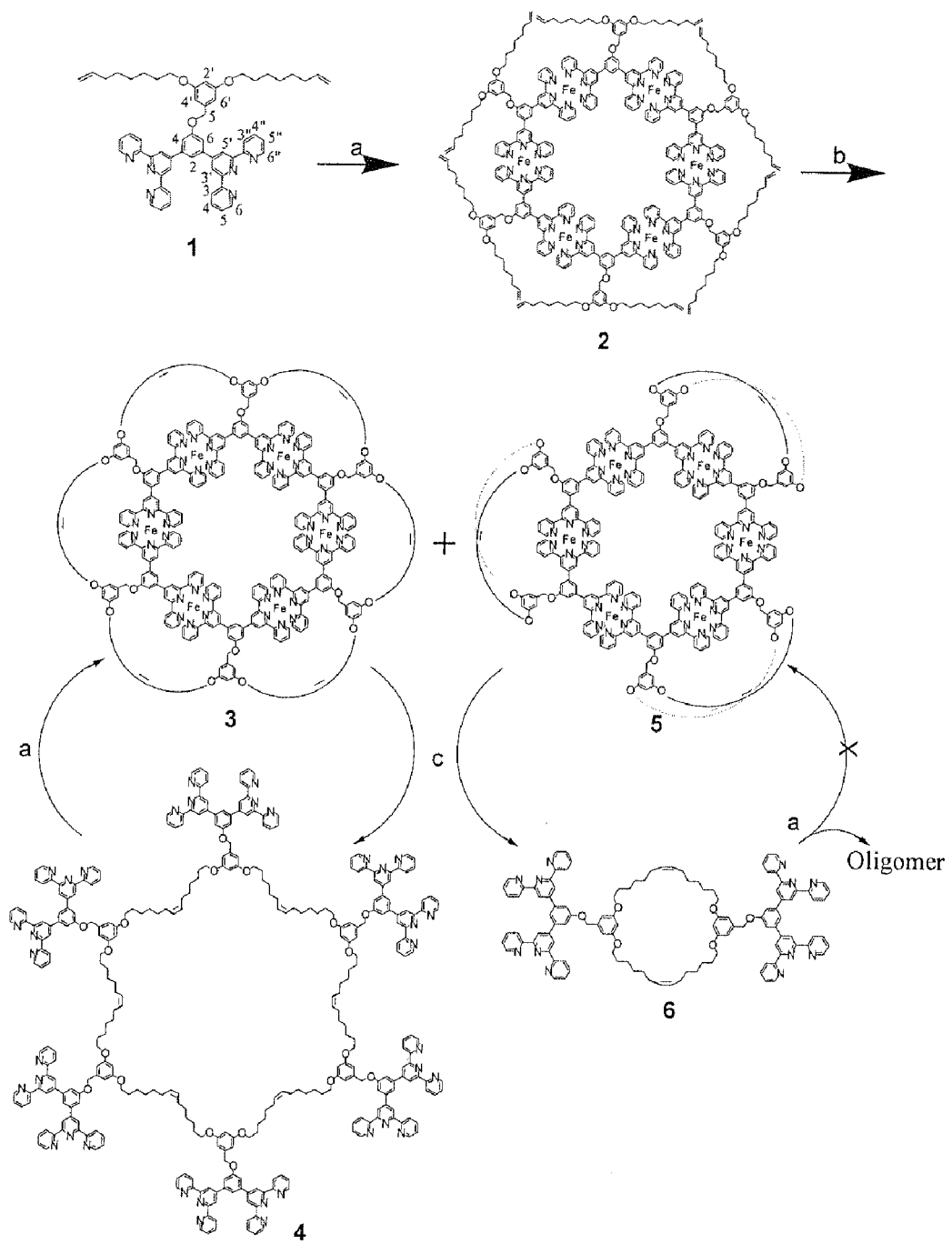
FIG. 3 is a schematic representation of a synthesis showing reversible metallation-dematallation of a templated hexamer.

As seen in FIG. 3, the alkene-modified ligand 1 was then treated with FeCl$_2$ in MeOH to form a deep purple solution, from which the heliotrope, microcrystalline hexamer 2 was isolated (91%) and confirmed ($^1$H NMR) by the downfield shift of the 3',5'-tpyH (s; δ=9.79, Δδ=+0.96 ppm), an upfield shift for the 6,6"-tpyH (d; δ=7.33, Δδ=−1.44 ppm), and the shift of 4,6-ArH positions (s; δ=8.27, Δδ=+0.66 ppm) upon complexation. The distinct singlets for the external 4',6'-ArH and CH$_2$ support the symmetric, homogenous hexamer 2, which was completely soluble in most of the common organic solvents.

Hexamer 2 was subsequently cross-linked using Grubbs' catalyst to generate two major products: the desired purple, microcrystalline, inner macrocyclic complex 3, possessing the 114-membered, hexaolefinic ethereal outer superstructure, as well as the isomeric by-product 5. Success of the cross-linking reaction was demonstrated ($^1$H NMR) by the disappearance of the terminal alkene absorptions at 5.88-5.78 and 5.04-4.94 ppm along with the appearance of a new peak at 5.61 for the formation of a new double bond as a mixture of E and Z isomers. Due to the isomeric nature of 3 and 5, quantitative demetalation ($K_2CO_3$, DMF) of this crude mixture was initially confirmed by the total loss of coloration, indicative of the disassembly of the hexameric core. The resultant white solid, comprised of the two major components 4 and 6, was readily separated by preparative TLC ($Al_2O_3$) eluting with a 3:1 mixture of EtOAc and hexane. The expected macrocycle 4 had a triplet peak at 5.36 ppm confirming the presence of the double bonds as well other signature NMR peaks and a definite peak at m/z 2612.8 (ESI-MS) for $(M+2H)^{2+}$. The nominal dimeric byproduct 6, generated from 5, was also separated and confirmed by NMR and ESI-MS spectrum. The cross-linking reaction greatly depends upon the concentration of hexamer 2; in general, it was found that concentrations greater than $10^{-4}$ M could generate more complex mixtures. Subsequent treatment of pure hexa-bis-terpyridine macrocycle 4 with Fe(II) regenerated the purple microcrystalline 3, which was readily demetalated ($K_2CO_3$, DMF) again to recover the original ligand 4 in a respectable overall conversion (85%; after chromatography).

Figure 4:
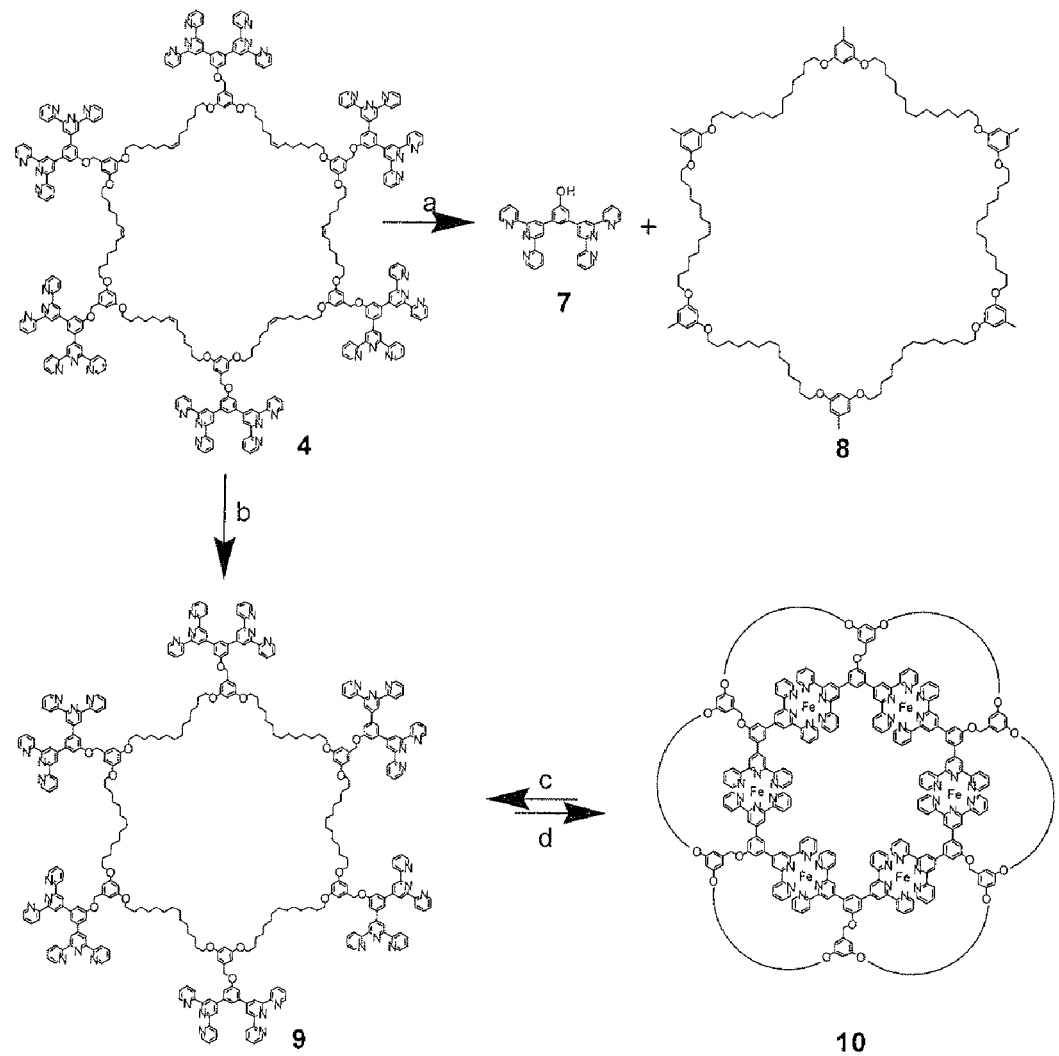
FIG. 4 is a schematic representation of a second variation of a synthesis showing reversible metallation-dematallation of a templated hexamer.
Figure 5:
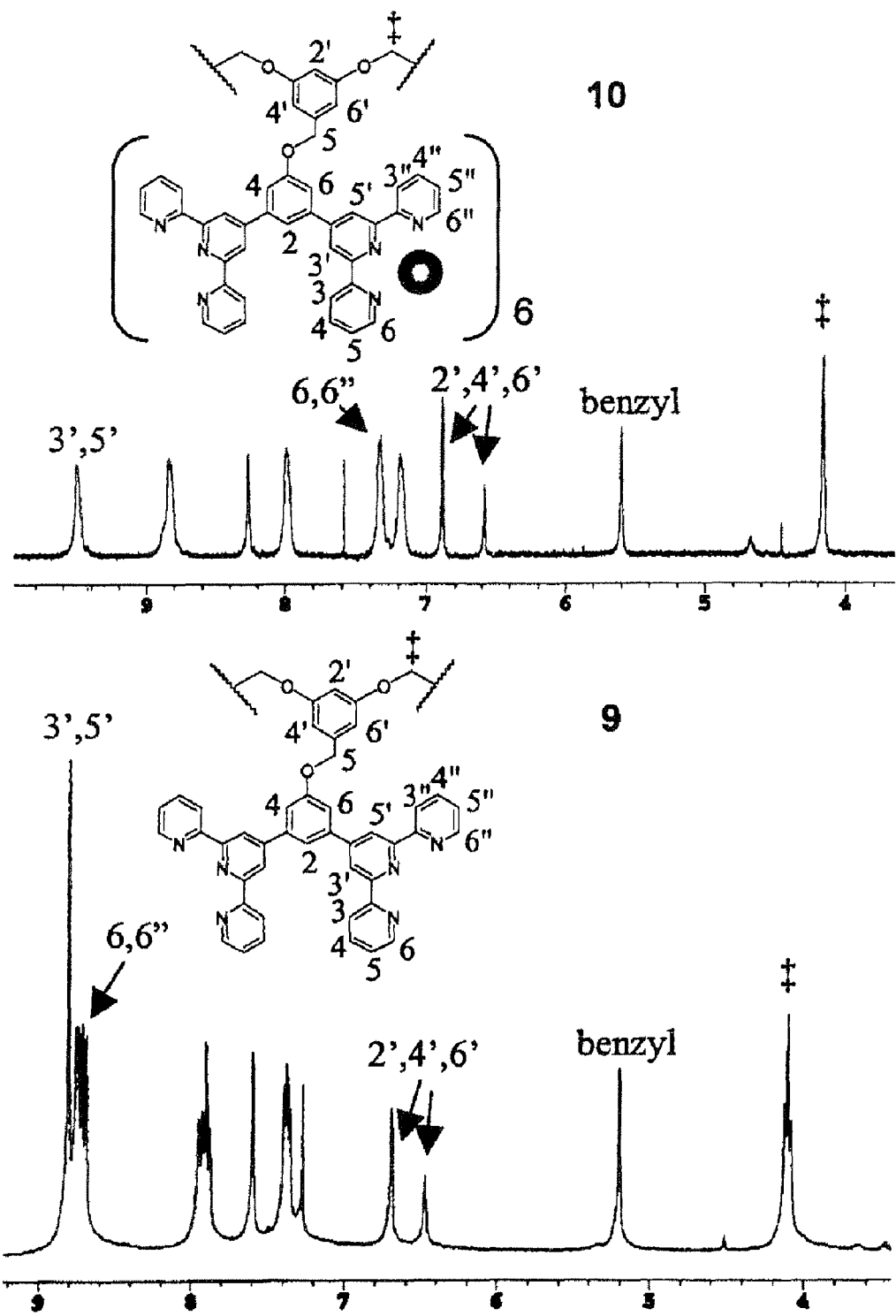
FIG. 5 is a 1H NMR spectra of the metallated hexamer template 10 (upper; 750 MHz) and the demetallated polyterpyridine-modified, 114-membered cycloalkane 9 (lower; 300 MHz).

As seen in FIG. 4, it is shown that in order to remove the structural complexity caused by the mixture of cis and trans olefinic configurations, the macrocycle ligand 4 was hydrogenated [(5 or 10%) Pd/C, EtOH, THF (2/1, v/v)]; however, olefin reduction was accompanied with the unwanted debenzylation affording (100%) the macrocycle 8, as a viscous oil, and hydroxybisterpyridine 7, that was identical to the original starting material 1. Whereas, the use of Raney-Ni with hydrazine in EtOH gave rise to smooth reduction of the olefinic centers and circumvented the unwanted debenzylation resulting in a pale blue-green solution, which may be derived from traces of terpyridine-nickel complexes; refluxing in ethanolic $K_2CO_3$ for 1 hour subsequently afforded (>90%) the pure terpyridine-modified, ethereal macrocycle 9 after chromatography [$Al_2O_3$, EtOAc, hexane (3:1)]. The reduced superstructure was confirmed ($^1$H NMR) by the disappearance of the olefinic proton absorption as seen in FIG. 5. The structure was further identified by the mass peak at m/z 2641.5 (ESI-MS) for $(M+2Na)^{2+}$.

Treatment of the dodeca-ligand 9 with $FeCl_2$ in MeOH gave a deep purple solid, which was column chromatographed ($SiO_2$) eluting with a 1:7:1 mixture of $H_2O$, MeCN, and $KNO_3$, followed by counter-ion exchange with $PF_6^-$ to give (80%) hexamer 10. Quantitative disassembly of 10 with $K_2CO_3$ in DMF resulted in the reformation of the metal-free 9, which was again transformed back to complex 10; assembled and disassembled samples were identical in all aspects to the original materials. Since there are no opportunities for structural repair in this assembly process via this mode of construction, as expected, there is a minor (ca. 3-5%) loss in each re-assembly phase. After removal of the pure regenerated hexamer by simple chromatography, all defective materials were simply treated with base to recover the original dodeca-ligand. Using this recyclization procedure, overall yields can approach 100%.

The following working examples are given to illustrate the disclosed ligands and complexes prepared in reversible metallation-demetallation method of the present invention.

EXAMPLE 1

Synthesis and Characterization of the Primary Hexameric Metallomacrocycle 2: Self-Assembly of the Inner Ring To a solution of 3,5-di(octenyloxy)benzyloxybisterpyridine (1; 130 mg) dissolved in $CHCl_3$ (15 mL), was slowly added dropwise a mixture of $FeCl_2$ (one equiv.) in MeOH (60 mL) at 25° C. The resultant purple solution was filtered through a celite layer then evaporated in vacuo to give (91%) deep purple crystals. The counterions were exchanged by added $NH_4PF_6$ to give pure hexamer 2: mp >300° C. $^1$H NMR ($CDCl_3/CD_3OD$ in 1/1) 9.79 (s, 4H, ArH$^{3',5'}$), 9.11 (s, 5H, ArH$^2$+PyH$^{3', 3''}$), 8.27 (s, 2H, ArH$^{4,6}$), 8.01 (s, 4H, PyH$^{4,4''}$), 7.33 (s, 4H, PyH$^{6,6''}$), 7.25 (s, 4H, PyH$^{5,5''}$), 6.86 (s, 2H, BnH), 6.53 (s, 1H, BnH), 5.80-5.71 (m, 2H, CCH=C), 5.59 (s, 2H, OCH$_2$Ar), 4.98-4.73 (m, 4H, C=CH$_2$), 4.04 (t, 4H, OCH$_2$), 2.02 (m, 4H, CH$_2$), 1.80 (m, 4H, CH$_2$), 1.49-1.25 (m, 12H, CH$_2$). ESI-MS (7469.42; $C_{354}H_{348}F_{72}Fe_6N_{36}O_{18}P_{12}$): m/z: 1722.6 (M–4PF$_6$)$^{4+}$, 1349.5 (M–5PF$_6$)$^{5+}$, 1100.3 (M–6PF$_6$)$^{6+}$, 922.1 (M–7PF$_6$)$^{7+}$, 789.0 (M–8PF$_6$)$^{8+}$ 685.1 (M–9PF$_6$)$^{9+}$, 602.3 (M–10PF$_6$)$^{10+}$.

EXAMPLE 2

Synthesis and Characterization of the Supporting Macrocycle 3: Secondary, Band-like, Framework Construction To a degassed solution of hexamer 2 (120 mg, 1.6×10 M) in dry $CH_2Cl_2$ (1.00 L) at 25° C., a solution of Grubbs' catalyst (5.4 mg, 10% eq.) (Aldrich, first generation) in benzene was added at once. The reaction mixture was stirred for two days at 25° C. The solvent was removed in vacuo to give a deep purple solid, which was dissolved in $CH_3CN$/MeOH (1/4, v/v), and then additional $NH_4PF_6$ in MeOH was added until the product precipitated. The mixture was filtered through a celite layer, washed with warm mixture of benzene and MeOH to remove the trace of Grubbs' reagent. After work up, 105 mg of purple microcrystalline mixture was obtained and directly used for next demetalation. The $^1$H NMR ($CD_3CN$) showed a clear disappearance of the terminated alkenes, a new peak at=5.60 presented the new double bond.

EXAMPLE 3

Synthesis and Characterization of Macrocycle 4: Disassembly of the Primary Hexameric Metallomacrocycle A mixture of macrocyclohexamers (3 and 5; 90 mg), derived from above cross-linking, was dissolve in DMF (35 mL) at 25° C. then $K_2CO_3$ (70 mg) was added; the mixture was stirred at 80° C. for 5 hrs. The original purple coloration started to diminish after an hour, and ultimately became a clear solution shortly thereafter. At this stage, the solvent was evaporated in vacuo to give a pale yellow residue, which was extracted with $CHCl_3/H_2O$; the organic phase was washed with brine and dried ($Na_2SO_4$), filtered, concentrated in vacuo to give a solid, which was chromatographed (ThLC; $Al_2O_3$) eluting with a EtOAc/hexane (3/1) mixture affording 4, as an off-white powder precipitated from $CH_2Cl_2$ and hexane: 31 mg (43%); mp: 82-85° C. $^1$H NMR ($CDCl_3$) 8.80 (s, 4H, ArH$^{3',5'}$), 8.76 (d, 4H, PyH$^{6,6''}$), 8.71 (d, 4H, PyH$^{3',3''}$), 7.94 (s, 1H, ArH$^2$), 7.90 (t, 4H, PyH$^{4,4''}$), 7.58 (s, 2H, ArH$^{4,6}$), 7.39 (t, 4H, PyH$^{5,5''}$), 6.71 (2 s, 2H, BnH), 6.45 (m, 1H, BnH), 5.36 (t, 2H, CH=CH/trans and cis), 5.19 (s, 2H, OCH$_2$Ar), 4.07 (t, 4H, OCH$_2$), 2.02 (m, 4H, CH$_2$), 1.80 (m, 4H, CH$_2$), 1.47 (m, 4H, CH$_2$), 1.38 (m, 4H, CH$_2$), 0.89 (m, 4H, CH$_2$); $^{13}$C NMR 160.4, 160.1, 156.4, 156.2, 150.4, 149.4, 141.2, 139.2, 137.1, 130.8, 130.3, 124.1, 121.6, 119.5, 114.7, 108.1, 107.6 100.5, 70.5, 68.4, 32.2, 29.9, 29.1, 28.0, 27.6, 25.4; ESI-MS: m/z 2612.8 amu $(M+2H)^{2+}$, 2635.3 amu $(M+2Na)^{2+}$, 2643.2 amu $(M+K+Na)^{2+}$, 1742.9 amu $(M+3H)^{3+}$, 1764.9 amu $(M+3Na)^{3+}$, 1774.2 amu $(M+Na+2K)^{3+}$.

EXAMPLE 4

Synthesis and Characterization of Macrocyclic Complex 6

A second fraction was also eluted from the above mixture 4. Complex 6 was isolated as a white powder: ca. 40%; mp: 80-83° C.; $^1$H NMR (CDCl$_3$) δ 8.78 (s, 4H, ArH$^{3',5'}$), 8.74 (d, 4H, pyH$^{6,6''}$), 8.70 (d, 4H, PyH$^{3,3''}$), 7.93 (s, 1H, ArH$^2$), 7.89 (t, 4H, PyH$^{4,4''}$), 7.57 (s, 2H, ArH$^{4,6}$), 7.35 (t, 4H, PyH$^{5,5''}$), 6.67 (2 s, 2H, BnH), 6.44 (m, 1H, BnH), 5.38 (t, 2H, CH=CH/trans and cis), 5.18 (s, 2H, OCH$_2$Ar), 3.98 (t, 4H, OCH$_2$), 1.98 (m, 4H, CH$_2$), 1.77 (m, 4H, CH$_2$), 1.45 (m, 4H, CH$_2$), 1.36 (m, 4H, CH$_2$), 0.86 (m, 4H, CH$_2$). ESI-MS: m/z 1743.2 (M+H)$^+$, 1765.0 (M+Na)$^+$.

EXAMPLE 5

Regeneration of Ligand 7 and Isolation and Characterization of Macrocycle 8: Proof of Structure Attempted reduction of the double bonds with Pd/C and hydrogen was initially done by directly using the above mixture of 4 and 6 from the demetalation. After the work-up, a white powder 7 was isolated (100%) and shown to be identical starting material; thus, the product of debenzylation. There was also isolated an oil residue 8, which possessed neither the alkene nor terpyridine $^1$H and $^{13}$C NMR resonances.

EXAMPLE 6

Synthesis and Characterization of Ethereal Macrocycle 9: Proof of Structure by Alkene Reduction A suspension of macrocyclic hexabisterpyridine 4 (35 mg, 6.8 ÿmol) in EtOH (20 mL) with Raney-Ni and hydrazine was stirred. After 4 hrs, the catalyst was filtered to give a pale green solution, which was refluxed further with K$_2$CO$_3$ for 2 hrs affording a pale yellow solution. The solution was filtered through a celite layer, evaporated in vacuo and chromatographed (basic Al$_2$O$_3$) eluting with a mixture of hexane and EtOAc (1:4) to give (91%) the pure 9, as a wax-like powder: 32 mg; mp: 75-78° C.; $^1$H NMR (CDCl$_3$) 8.81 (s, 4H, ArH$^{3',3'}$), 8.76 (d, 4H, PyH$^{6,6''}$), 8.72 (d, 4H, PyH$^{3,3''}$), 7.95 (s, 1H, ArH$^2$), 7.91 (t, 4H, PyH$^{4,4''}$), 7.60 (s, 2H, ArH$^{4,6}$), 7.37 (t, 4H, PyH$^{5,5''}$), 6.70 (2 s, 2H, BnH), 6.47 (m, 1H, Bn H), 5.21 (s, 2H, OCH$_2$Ar), 4.10 (t, 4H, OCH$_2$), 1.78 (m, 4H, CH$_2$), 1.49 (m, 4H, CH$_2$), 1.38 (m, 4H, CH$_2$), 1.29 (m, 8H, CH$_2$). $^{13}$C NMR (CDCl$_3$) 160.7, 156.4, 156.3, 150.4, 149.4, 141.2, 139.2, 137.1, 124.1, 121.6, 119.5, 114.7, 114.7, 106.9, 102.0, 100.2, 68.4, 28.7, 28.4, 28.2, 27.9, 25.2. ESI-MS: m/z 2623.8 (M+2H)$^{2+}$, 2641.5 (M+2Na)$^2$, 2652.5 (M+K+Na)$^2$, 2659.7 (M+2K)$^2$.

EXAMPLE 7

Remetallation Process to Produce 3: Proof of Metal Reversibility by Primary Metallomacrocycle Regeneration To a solution of 4 (20 mg) dissolved in CHCl$_3$ (15 mL), was slowly added dropwise a mixture of FeCl$_2$ (one equiv.) in MeOH (60 mL) at 25° C. The resultant purple solution was filtered through a celite layer then evaporated in vacuo to give (81%) deep purple crystals. The counterions were exchanged by added NH$_4$PF$_6$ to give pure hexamer 3: mp >300° C.; $^1$H NMR (CD$_3$CN) 9.48 (s, 4H, ArH$^{3',5'}$), 8.83 (s, 5H, ArH$^2$+PyH$^{3,3''}$), 8.29 (s, 2H, ArH$^{4,6}$), 8.02 (s, 4H, PyH$^{4,4''}$), 7.34 (s, 4H, PyH$^{6,6''}$), 7.24 (s, 4H, PyH$^{5,5''}$), 6.90 (s, 2H, BnH), 6.62 (s, 1H, BnH), 5.62 (m, 2H, CH=CH), 5.43 (s, 2H, OCH$_2$Ar), 4.18 and 4.07 (m, 4H, OCH$_2$), 1.85 (m, 4H, CH$_2$), 1.48-1.01 (m, 16H, CH$_2$).

EXAMPLE 8

Remetallation Process to Produce 10: Proof of Metal Reversibility by Primary Metallomacrocycle Regeneration The metal reversible process to produce 10 was identical to that of 3. The purple microcrystalline 10 was isolated in >90% yield: mp: >300° C.; $^1$H NMR (CD$_3$CN) 9.51 (s, 4H, ArH$^{3',5'}$), 8.83 (s, 5H, ArH$^2$+PyH$^{3,3''}$), 8.27 (s, 2H, ArH$^{4,6}$), 7.99 (s, 4H, PyH$^{4,4''}$), 7.33 (s, 4H, PyH$^{6,6''}$), 7.18 (s, 4H, PyH$^{5,5''}$), 6.89 (s, 2H, BnH), 6.58 (s, 1H, BnH), 5.60 (s, 2H, OCH$_2$Ar), 4.16 (t, 4H, OCH$_2$), 1.77 (m, 4H, CH$_2$), 1.48 (m, 4H, CH$_2$), 1.30 (m, 12H, CH$_2$). Anal. Calcd for $C_{342}H_{336}Cl_{12}Fe_6N_{36}O_{18}$ (5999.06)+(26 H$_2$O): C, 63.51; H, 6.05; N, 7.80. Found: C, 63.52; H, 6.10; N, 7.31. ESI-MS (6615.28, $C_{342}H_{336}B_{12}F_{48}Fe_6N_{36}O_{18}$;): m/z 2118.5 (M–3BF$_4$)$^{3+}$, 1567.2 (M–4BF$_4$)$^{4+}$, 1236.5 (M–5BF$_4$)$^{5+}$, 1015.8 (M–6BF$_4$)$^{6+}$, 858.5 (M–7BF$_4$)$^{7+}$, 740.1 (M–8BF$_4$)$^{8+}$, 648.1 (M–9BF$_4$)$^{9+}$, 574.8 (M–10BF$_4$)$^{10+}$, 514.7 (M–11BF$_4$)$^{11+}$, 464.3 (M–12BF$_4$)$^{12+}$.

EXAMPLE 9

Demetalation

Iron hexamer 3 and 10 can be quantitatively demetalated by heat with K$_2$CO$_3$ and DMF at 80° C. to reverse the free ligands 4 and 9. The NMR and mass spectra are the exactly same as their precursors.

The invention has been described in an illustrative manner, and it is to be understood that the terminology that has been used is intended to be in the nature of words of description rather than of limitation.

To illustrate the invention, it is shown and described with respect to specific embodiments. This is not intended as a limitation, and other modifications or variations in the specific form shown and described will be apparent to those skilled in the art.

What is claimed is:

1. A method of preparing a metallomacrocycle, the method comprising the steps of:

preparing an alkene-modified ligand, wherein the ligand is a terpyridine;

reacting a plurality of ligands with a first source of a metal ion to form a primary hexameric metallomacrocycle;

crosslinking the primary hexameric metallomacrocycle with a first catalyst;

forming a self-assembled metallated macrocyclic complex

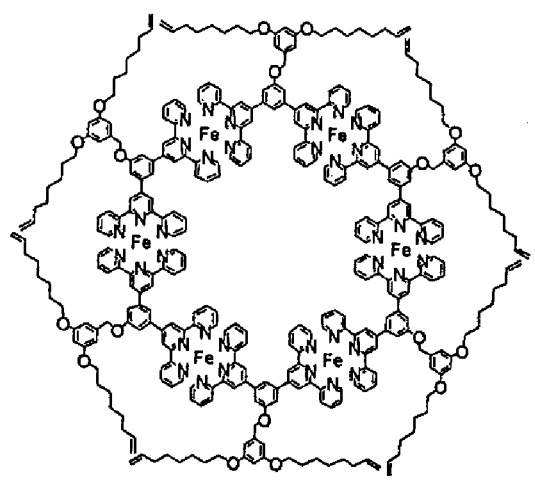
2 and a macromolecular secondary superstructure

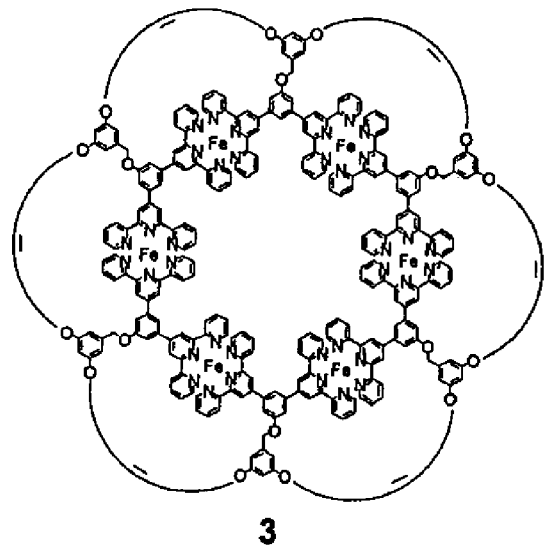
3 wherein the metallated macrocyclic complex is embedded within the macromolecular secondary superstructure

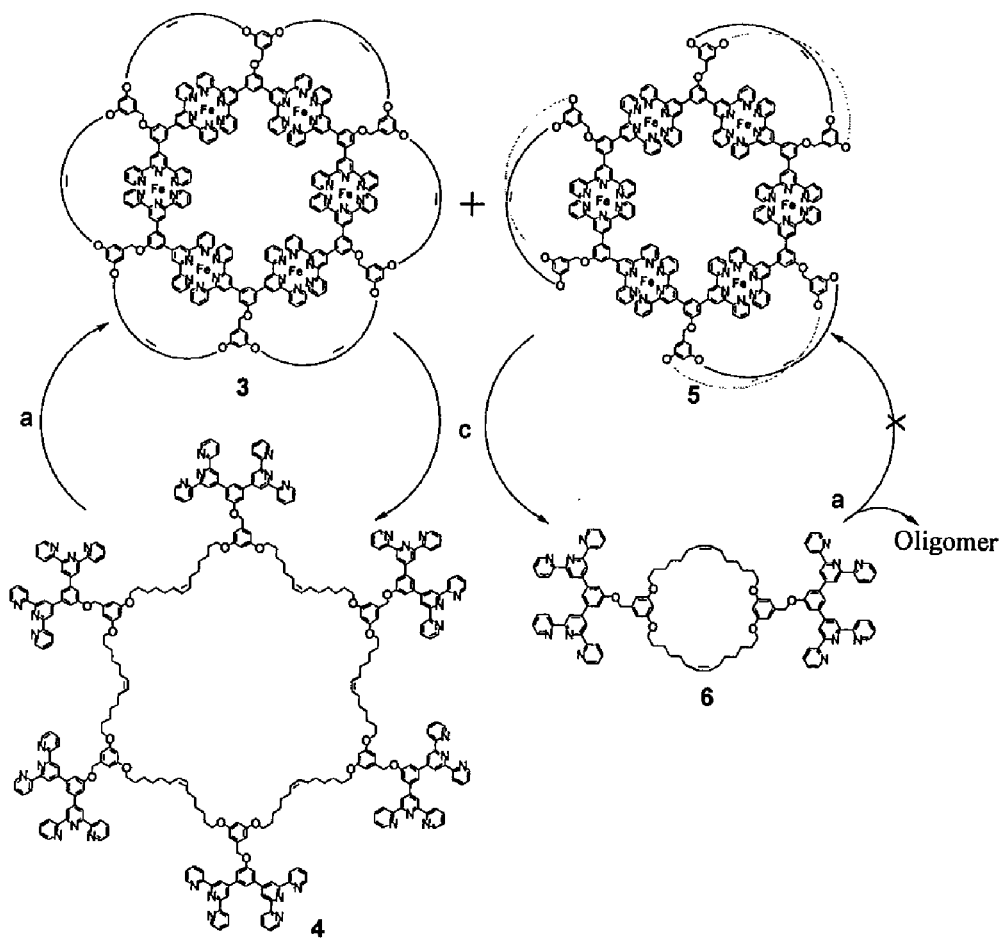

disassembling the self-assembled metallated macrocyclic complex by demetallation to form a demetallated macrocycle.

2. The method of claim 1, wherein the catalyst is a Grubbs catalyst.

3. The method of claim 1, wherein the macromolecular secondary superstructure has a hexaolefinic ethereal structure

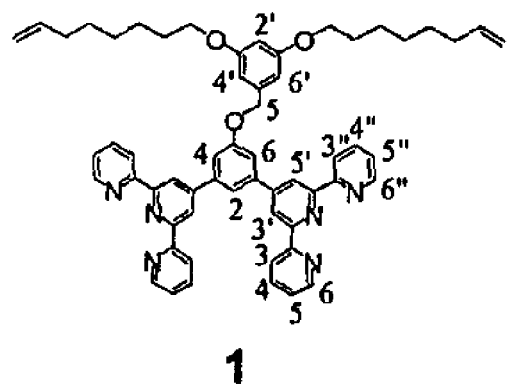

4. The method of claim 1, further comprising:
reducing the demetallated macrocycle with at least a second catalyst to form an ethereal macrocycle; and
reacting the ethereal macrocycle with at least a second source of a metal ion to form the metallated macrocyclic complex and a macromolecular secondary superstructure, wherein the metallated macrocyclic complex is embedded within the macromolecular secondary superstructure.

5. The method of claim 4, wherein the ethereal macrocycle is a terpyridine-modified, ethereal macrocycle.

6. A method of reversibly self-assembling an imbedded metallomacrocycle within a macromolecular secondary superstructure, the method comprising the steps of:
preparing an alkene-modified ligand, wherein the ligand is a terepyridine;
reacting a plurality of the alkene-modified ligands with at least a first source of a metal ion to form a primary hexameric metallomacrocycle;
crosslinking the primary hexameric metallomacrocycle with a first catalyst;
forming a self-assembled metallated macrocyclic complex

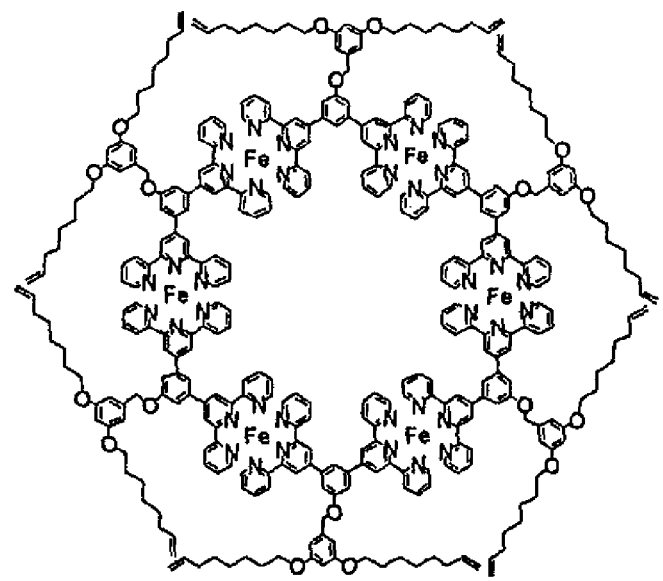
2 and a macromolecular secondary superstructure,

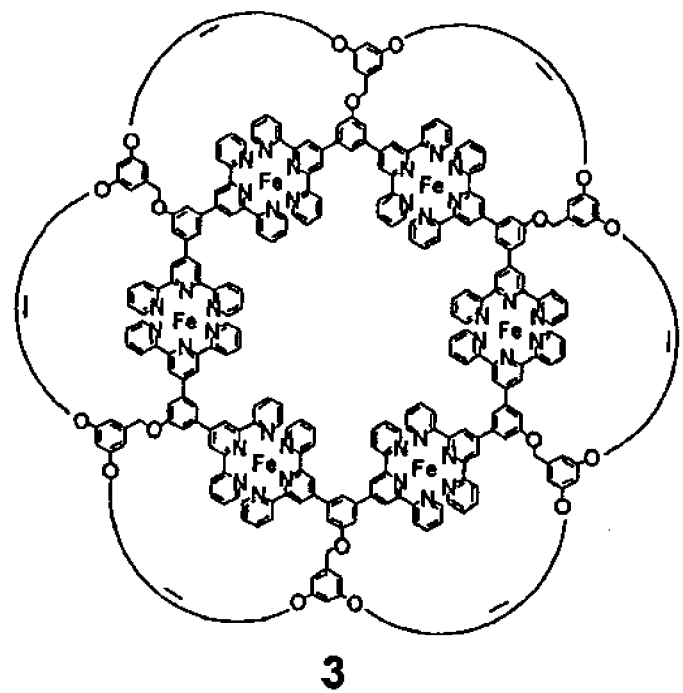

wherein the metallated macrocyclic complex is embedded within the macromolecular secondary superstructure

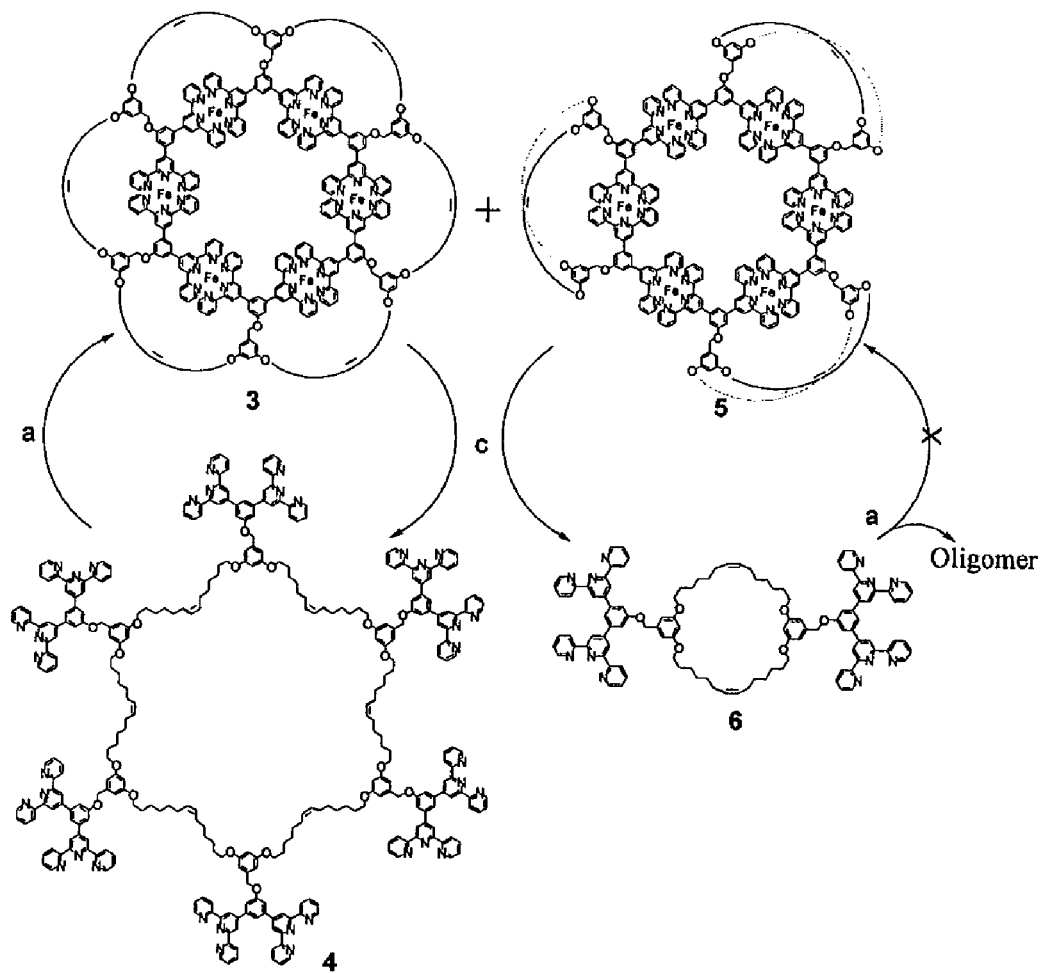

disassembling the self-assembled metallated macrocyclic complex by demetallation to form a demetallated macrocycle.

7. The method of claim 6 further comprising the steps of:
reducing the demetallated macrocycle with at least a second catalyst to form an ethereal macrocycle; and
reacting the ethereal macrocycle with at least a second source of a metal ion to regenerate the metallated macrocyclic complex and a macromolecular secondary superstructure, wherein the metallated macrocyclic complex is embedded within the macromolecular secondary superstructure.

8. The method of claim 1, wherein a solution of iron chloride is the first source of the metal ion.

9. The method of claim 4, wherein a solution of iron chloride is the second source of the metal ion.

10. The method of claim 4, wherein the second catalyst is a Raney-nickel catalyst.

11. The method of claim 6, wherein a solution of iron chloride is the first source of the metal ion.

12. The method of claim 7, wherein a solution of iron chloride is the second source of the metal ion.

13. The method of claim 6, wherein the first catalyst is a Grubbs' catalyst.

14. The method of claim 7, wherein the second catalyst is a Raney-nickel catalyst.

* * * * *

UNITED STATES PATENT AND TRADEMARK OFFICE
CERTIFICATE OF CORRECTION

| | | |
|---|---|---|
| PATENT NO. | : 8,148,438 B2 | Page 1 of 1 |
| APPLICATION NO. | : 11/720088 | |
| DATED | : April 3, 2012 | |
| INVENTOR(S) | : George R. Newkome et al. | |

It is certified that error appears in the above-identified patent and that said Letters Patent is hereby corrected as shown below:

On the Title page, Item (54) & Column 1, line 2, please delete "IMBEBBED" and insert in place thereof "IMBEDDED"

Signed and Sealed this
Tenth Day of July, 2012

David J. Kappos
*Director of the United States Patent and Trademark Office*